US011606852B2

United States Patent
Guo et al.

(10) Patent No.: US 11,606,852 B2
(45) Date of Patent: Mar. 14, 2023

(54) VOICE COMMUNICATION BETWEEN LAMP AND REMOTE DEVICE PLUS LIGHTING CONTROL VIA REMOTE DEVICE

(71) Applicant: CONSUMER LIGHTING (U.S.), LLC, Norwalk, CT (US)

(72) Inventors: Guangting Guo, Shanghai (CN); Kun Xiao, Shanghai (CN); Mathew Sommers, East Cleveland, OH (US); Xin Qian, Shanghai (CN); Chengbin Liu, Shanghai (CN); Chunfeng Hong, Shanghai (CN); Abhinav Bhandari, East Cleveland, OH (US)

(73) Assignee: SAVANT TECHNOLOGIES LLC, Norwalk, CT (US)

( * ) Notice: Subject to any disclaimer, the term of this patent is extended or adjusted under 35 U.S.C. 154(b) by 47 days.

(21) Appl. No.: 16/921,800

(22) Filed: Jul. 6, 2020

(65) Prior Publication Data
US 2021/0007202 A1 Jan. 7, 2021

(30) Foreign Application Priority Data

Jul. 4, 2019 (CN) .......................... 201910598692.7

(51) Int. Cl.
*H05B 47/12* (2020.01)
*G06F 3/16* (2006.01)
(Continued)

(52) U.S. Cl.
CPC ............. *H05B 47/12* (2020.01); *G06F 3/167* (2013.01); *H05B 45/10* (2020.01); *H05B 47/19* (2020.01)

(58) Field of Classification Search
CPC ...... H05B 47/115; H05B 47/12; H05B 47/13; H05B 47/19; H05B 47/195; H05B 47/11;
(Continued)

(56) References Cited

U.S. PATENT DOCUMENTS

| 2018/0187484 | A1* | 7/2018 | Hebeisen | ................. F24F 11/30 |
| 2018/0228006 | A1* | 8/2018 | Baker | ..................... G10L 15/22 |
| 2021/0045220 | A1* | 2/2021 | Barna | .................... H05B 47/19 |

FOREIGN PATENT DOCUMENTS

| CN | 201661867 U | 12/2010 |
| CN | 103527937 A | 1/2014 |

(Continued)

*Primary Examiner* — Monica C King
(74) *Attorney, Agent, or Firm* — Wood IP LLC (57) ABSTRACT

A control device, lighting device including the control device, a lighting system and a method for controlling the lighting device are provided. In embodiments, the control device may comprise a communication unit and a controller. The communication unit may be operable to communicatively connect with a remote controller via a first wireless network and operable to communicatively connect with at least one mobile device via a second wireless network. The controller may be coupled to the communication unit and the lighting device, and configured to control the lighting device based on at least one signal of those received by the communication unit from the remote controller and the at least one mobile device. The first wireless network and the second wireless network operate at different bands. The lighting system may include the lighting device and the remote controller.

39 Claims, 4 Drawing Sheets

(51) Int. Cl.
*H05B 45/10* (2020.01)
*H05B 47/19* (2020.01)

(58) Field of Classification Search
CPC ...... H05B 47/155; H05B 45/10; H05B 45/12;
H05B 45/20; H05B 45/22; H05B 45/37;
H05B 47/16; G08B 13/19656; G08B
13/1966; F21L 4/005; F21Y 2115/10
See application file for complete search history.

(56) References Cited

FOREIGN PATENT DOCUMENTS

| | | |
|---|---|---|
| CN | 105042531 A | 11/2015 |
| CN | 205196016 U | 4/2016 |

* cited by examiner

VOICE COMMUNICATION BETWEEN LAMP AND REMOTE DEVICE PLUS LIGHTING CONTROL VIA REMOTE DEVICE

FIELD

The present techniques relate generally to lighting field. More specifically, the present techniques relate generally to a lighting device controllable by a remote controller, a lighting system including both, and a method thereof, for application of nursery.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Parents usually pay more attention to baby, and hope that they can grasp the status of the baby (such as sleep state) even if they are not at the baby's side. Sometimes parents may want to speak to the baby or listen to the baby and its surroundings remotely.

In order to accommodate the needs of nursery, some lighting devices, such as light bulbs, are designed to have communication functions to communicate with, for example, a remote controller, a mobile device, etc.

However, when such lighting device simultaneously communicates with a remote controller and a mobile device, Bluetooth and Wi-Fi are typically used to for example, connect to the remote controller via Bluetooth and connect to the mobile device via Wi-Fi. Since the operating frequencies of Bluetooth and Wi-Fi are similar, both are 2.4 GHz, there is a problem of radio frequency (RF) interference, which may cause control errors.

SUMMARY

The present disclosure provides a control device for controlling a lighting device. The control device may comprise a communication unit and a controller. The communication unit may be operable to communicatively connect with a remote controller via a first wireless network and operable to communicatively connect with at least one mobile device via a second wireless network. The controller may be coupled to the communication unit and the lighting device. The controller may be configured to control the lighting device based on at least one signal of those received by the communication unit from the remote controller and the at least one mobile device. The first wireless network and the second wireless network may operate at different bands.

One aspect of the disclosure is a remote controller for communicating with a lighting device. The remote controller may comprise a communication unit operable to communicatively connect with the lighting device, at least one speaker configured to output a first audio from the lighting device, and at least one microphone configured to acquire a second audio.

Another aspect of the disclosure is a control device for controlling a lighting device. The lighting device may includes at least one lighting unit, at least one microphone configured to acquire a first audio, and at least one speaker. The control device may comprise a communication unit and a controller. The communication unit may be operable to communicatively connect with the remote controller. The controller may be coupled to the communication unit and the lighting device. The controller may be configured to control the lighting device based on at least one signal of those received by the communication unit from the remote controller.

Yet another aspect of the disclosure is a lighting device. The lighting device may comprise at least one lighting unit and the control device described above.

Yet another aspect of the disclosure is a lighting system. The lighting system may comprise the control device described above and the remote controller described above.

Yet another aspect of the disclosure is a method for controlling a lighting device. The lighting device may include a communication unit; and a controller coupled to the communication unit. The method may comprise communicatively connecting, by the communication unit with a remote controller via a first wireless network, and communicatively connecting, by the communication unit with at least one mobile device via a second wireless network. The first wireless network and the second wireless network may operate at different bands.

BRIEF DESCRIPTION OF THE DRAWINGS

The present disclosure can be better understood in light of description of one embodiment of the present disclosure with reference to the accompanying drawings, in which.

DETAILED DESCRIPTION

Unless defined otherwise, the technical or scientific terms used herein should have the same meanings as commonly understood by one of ordinary skilled in the art to which the present disclosure belongs. The terms "first", "second" and the like in the Description and the Claims of the present application for disclosure do not mean any sequential order, number or importance, but are only used for distinguishing different components. Likewise, the terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The terms "coupled", "connected" and the like are not limited to being connected physically or mechanically, but may comprise electric connection, no matter directly or indirectly.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The lighting device of this disclosure utilizes Walkie Talkie as one of the communication paths of the lighting device. Since the operation frequency of Walkie Talkie is different from Bluetooth or Wi-Fi, RF interference can be mitigated or eliminated.

Further, the lighting device of this disclosure may transmit and receive audio with remote controller and mobile device and the lighting device may operate in various modes, thereby the lighting device is advantageous for application of nursery.

Exemplary Lighting Devices

Figure 1:
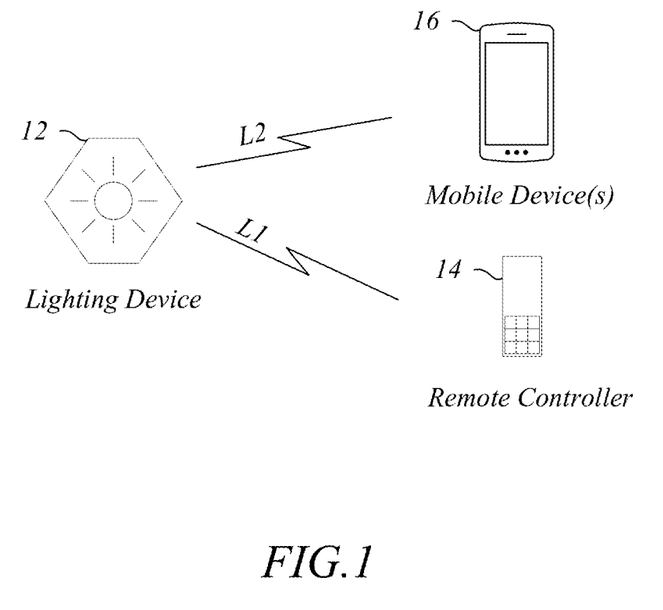
FIG. 1 is a schematic diagram of an example lighting device 12 capable of wirelessly communicating with remote controller 14 and mobile device(s) 16, in accordance with an embodiment.

FIG. 1 is a schematic diagram of an example lighting device 12 capable of wirelessly communicating with remote controller 14 and mobile device(s) 16, in accordance with an embodiment. The term "capable" means the lighting device 12 do not need to be in a communicating condition with the remote controller 14 and the mobile device(s) 16 all the time. The lighting device 12 may be wirelessly communicating with the remote controller 14 and/or the mobile device(s) 16 at one time or even disconnected with both of the remote controller 14 and the mobile device(s) 16.

The lighting device 12 may be operable to communicate with the remote controller 14 and the mobile device(s) 16 via wireless networks of different bands. For example, the lighting device 12 may be operable to communicate with the remote controller 14 via a first wireless network L1 which operates at a band less than 1 GHz, and to communicate with the mobile device(s) 16 via a second wireless network L2 which operates at a band of approximately 2.4 GHz. The first wireless network L1 may use Walkie Talkie (such as 915 MHz) and the second wireless network L2 may use shorter range wireless communications such as Wi-Fi and Bluetooth. Since the first wireless network L1 and the second wireless network L2 operate at different bands, the RF interference can be mitigated or eliminated.

The lighting device 12 may be a bulb, mounted or fixed anywhere in e.g. a baby room that may provide proper illumination. The lighting device 12 may be powered by home power supply, battery or the like or a combination thereof. In some embodiments, the lighting device 12 may be powered on by e.g. a wall switch and the lighting unit(s) thereof may be turned on/off by the remote controller 14. The lighting device 12 may automatically search and establish a communicative connection with the remote controller 14 via the first wireless network L1 when the remote controller 14 is found. In some embodiments, such automatic communicative connection may be deactivated or failed when two or more remote controllers 14 are found. In this case, the lighting device 12 may include a pairing trigger, such as button, for establishing the communicative connection with one of the two or more remote controllers 14. For example, a user may hold the pairing trigger of the lighting device 12 and a trigger (such as power button, a pairing button, or the like) of the remote controller 14 at the same time for a period of time (e.g. 3 seconds) for pairing.

Examples of mobile devices 16 include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise secured hardware or software component within the mobile device and/or one or more external components that may be coupled to the mobile device.

Figure 2:
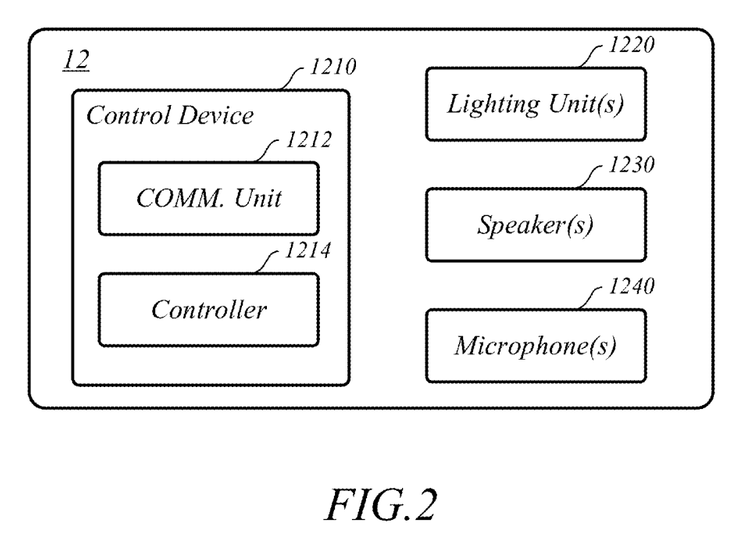
FIG. 2 is a block diagram of an example lighting device 12, in accordance with an embodiment.

FIG. 2 is a block diagram of an example lighting device 12, in accordance with an embodiment. The lighting device 12 may include a control device 1210 for controlling the lighting device 12, one or more lighting units 1220, one or more speakers 1230 and one or more microphones 1240. The control device 1210 may include a communication unit 1212 and a controller 1214.

The control device 1210 may be housed within the lighting device 12. The control device 1210 may be separate components or may be integrated in the circuit of the lighting device 12.

The communication unit 1212 may be operable to communicatively connect with the remote controller 14 via the first wireless network L1, and operable to communicatively connect with the mobile device(s) 16 via the second wireless network L2. In some embodiments, the first wireless network L1 may operate at a band less than 1 GHz such as 915 MHz for Walkie Talkie, and the second wireless network L2 may operate at a band of approximately 2.4 GHz for Wi-Fi or Bluetooth. The first wireless network L1 and the second wireless network L2 may operate at other bands as long as they are different from each other, in order to reduce the effect of the RF interference.

The controller 1214 may be coupled to the communication unit 1212, the lighting unit(s) 1220, the speaker(s) 1230 and the microphone(s) 1240 and control at least one of these components to perform one or more of the operations and/or procedures described throughout this disclosure.

The lighting unit(s) 1220 may be bulb(s), or LED(s), or the like, and may illuminate with various brightness under the control of the controller 1214.

The speaker(s) 1230 may output audio received from the remote controller 14 or the mobile device 16.

The microphone(s) 1240 may acquire audio from its surroundings. In some applications, the microphone(s) 1240 may be used to acquire the sound from the baby, such as speaking or crying.

Here, additional component(s) such as adaptor or other circuit component(s) may also be included in the lighting device 12, but is omitted for ease of illustration.

In some embodiments, the controller 1214 may be configured to control the communication unit 1212 to transmit the audio (corresponding to the first audio) acquired by the microphone(s) 1240 to the remote controller 14 via the first wireless network L 1. The communication unit 1212 may also be controlled to receive an audio (corresponding to the second audio) from the remote controller 1214 via the first wireless network L1. In the case of being communicatively connected with the mobile device 16, the communication unit 1212 may also be controlled to receive an audio (corresponding to the third audio) from the mobile device 16 via the second wireless network L2. Further, the speaker(s) 1230 may be controlled to output the audio from the remote controller 14 in response to a control signal from the remote controller 14, or the output the audio from the mobile device 16 in response to a control signal from the mobile device 16. The audio from the mobile device 16 may be stopped or paused by the mobile device 16.

With the configuration described above, the parent may hear the sound from the baby and speak to the baby using the remote controller 1214, and may play music for the baby with the mobile device 16. Since the first wireless network L1 operates at a lower band than the second wireless network L2, the connection via the first wireless network L1, i.e. the communication between the lighting device 12 and the remote controller 14 may have a longer coverage. Therefore, the remote controller 14 may get connection with the lighting device 12 at a farther location than the mobile device 16.

In some embodiments, the lighting device 12 may operate in various modes, including a deep dim mode, a dim mode and a lighting mode. The user (e.g. parent) may adjust the mode of the lighting device 12 by the remote controller 14.

The deep dim mode may be a mode where the brightness level of the lighting unit(s) 1220 is extremely low, for example 1%, which will not disturb while the baby is sleeping.

The dim mode may be a mode where the brightness level of the lighting unit(s) 1220 is higher than that of the deep dim mode, for example 30%. Other mode(s) with different brightness level of for example 60% may also be included.

The lighting mode may be a mode with full brightness level, i.e. 100%. In this mode, both of the speaker(s) 1230 and the microphone(s) 1240 are activated so that the parent may hear the sound from and speak to the baby.

In some embodiments, the lighting device 12 may be controlled to switch to the dim mode from the deep dim mode upon an acquisition of the audio by the microphone(s) 1240 when operating in the deep dim mode. Thus, when the lighting device 12 is operating in the deep dim mode, it will be switched to the dim mode with a brightness level of e.g. 30% if any sound detected from the room. The user (for example parent) may then observe the room through a camera mounted therein, for example. In addition, such change of the brightness level from deep dim mode (e.g. 1%) to dim mode (e.g. 30%) may not cause excessive irritation to the baby.

In some embodiments, the volume of the speaker(s) 1230 of the lighting device 12 may be adjusted by the remote controller 14. Thus, both of the volume of the audio from the remote controller 14 and the mobile device 16 can be adjusted by the remote controller 14. In some embodiments, the audio from the remote controller 14 and the audio from the mobile device 16 may have the same volume.

In some embodiments, the microphone(s) 1240 may be deactivated while the speaker(s) 1230 is outputting the audio from the mobile device 16, and may be activated upon the output of the audio from the mobile device 16 is stopped. Thus, the audio from the mobile device 16 will not be transmitted to remote controller 14. With this configuration, the user (for example parent) may not be disturbed while playing music for the baby with the mobile device 16. Once the output of the audio from the mobile device 16 is finished, the microphone(s) 1240 may be activated such that the sound around the lighting device 12 such as the sound from the baby may be acquired and transmitted to the remote controller 14.

In some embodiments, the output of the audio from the mobile device 16 may be interrupted upon receiving an audio from the remote controller 14. In this case, the speaker(s) 1230 may continue to output the audio from the mobile device 16 after the output of the audio from the remote controller 14 is finished. With this configuration, the user (for example parent) may speak to the baby while playing music with the mobile device 16.

In some embodiments, the lighting device 12 may be connected to a plurality of the mobile devices 16 simultaneously. The lighting device 12 may receive audio from two or more of the plurality of the mobile devices 16. In this case, the speaker(s) 1230 may be controlled to output the last audio from the plurality of the mobile devices 16. For example, assuming that the speaker(s) 1230 is outputting a first audio from a connected first mobile device, the speaker(s) 1230 may pause the first audio and start to output a second audio from a connected second mobile device upon receiving the second audio.

Exemplary Remote Controllers

Figure 3:
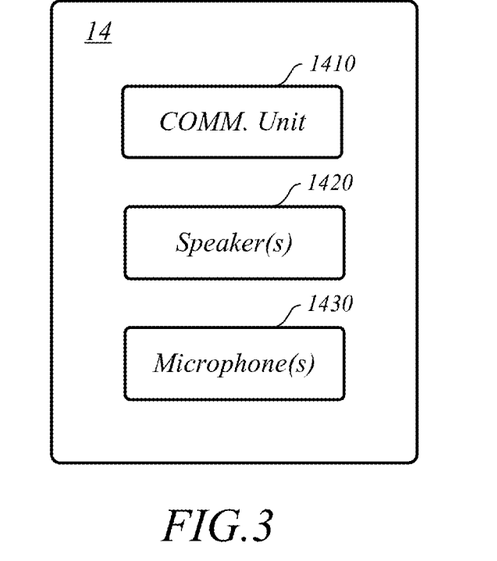
FIG. 3 is a block diagram of an example remote controller 14, in accordance with an embodiment.

FIG. 3 is a block diagram of an example remote controller 14, in accordance with an embodiment.

The remote controller 14 may include a communication unit 1410, one or more speaker 1420 and one or more microphone 1430.

The communication unit 1410 may be operable to search lighting device(s) 12 and to communicatively connect with the lighting device 12 via the first wireless network L1. The first wireless network L1 may operate at a band less than 1 GHz such as 915 MHz for Walkie Talkie. In some embodiments, the communication unit 1410 may be configured to automatically establish a communicative connect with the lighting device 12 when only one lighting device 12 is found. Further, the communication unit 1410 may be configured to deactivate such automatic communicative connect when two or more lighting devices 12 are found. In this case, a request from both of the two or more lighting devices 12 for establishing a communicative connect with the remote controller 14 may be failed.

The speaker(s) 1420 may output audio received from the lighting device 12.

The microphone(s) 1430 may acquire audio from its surroundings. In some applications, the microphone(s) 1430 may be used to acquire the sound from the user, such as parent.

The remote controller 14 may be used to implement various operations described above with the lighting device 12 and the mobile device 16.

Figure 4:
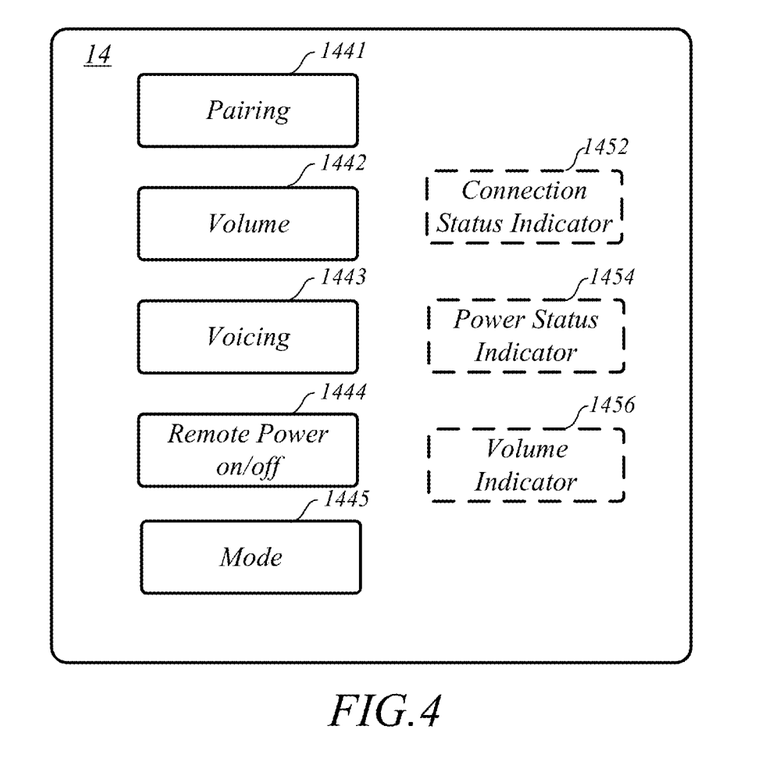
FIG. 4 shows example components of the example remote controller 14, in accordance with an embodiment.

FIG. 4 shows example components of the example remote controller 14, in accordance with an embodiment.

As shown in FIG. 4, the blocks illustrated by solid line represent components which can be operated by the user, such as button, trigger, or the like. In some embodiments, the components may be displayed in a touch panel and may be operated by touch. Further, the blocks illustrated by dashed line represent indicators indicative of some information. The indicators may include, but not limited to bulb, LED, display, or the like, or a combination thereof.

In some embodiments, the remote controller 14 may include a pairing trigger 1441, a volume adjuster 1442, a voicing trigger 1443, a remote power on/off 1444, a mode switching trigger 1445, a connection status indicator 1452, a power status indicator 1454 and a volume indicator 1456. However, it would be appreciated that one or more of these components can be omitted as needed.

The pairing trigger 1441 may be used to establish a communicative connection with the lighting device 12. As described above, the automatic communicative connection between the remote controller 14 and the lighting device 12 may be deactivated or failed when two or more remote controllers 14 are found by the lighting device 12. In this case, the user may for example hold a pairing trigger of the lighting device 12 and the pairing trigger 1441 of the remote controller 14 at the same time for a period of time (e.g. 3 seconds) for pairing. In some embodiments, the function of pairing may be integrated in the remote power on/off 1444 and thus the pairing trigger 1441 may be omitted.

The volume adjuster 1442 may be used to adjust the volume of the speaker(s) 1230 of the lighting device 12. Thus, both of the volume of the audio from the remote controller 14 and the mobile device 16 can be adjusted through the volume adjuster 1442, thereby the parent may control the volume when speaking to the baby or playing audio (for example music) for the baby.

The voicing trigger 1443 may be used to initiate the microphone(s) 1430 of the remote controller 14 to acquire audio when for example the parent want to speak to the baby. The acquired audio may then be transmitted to the lighting device 12 via the first wireless network L1.

The remote power on/off 1444 may be used to turn on/off the lighting units(s) 1220 of the lighting device 12 when being communicatively connected with the lighting device 12. In some embodiments, the remote power on/off 1444 may be used to pair with the lighting device 12 as described above.

The mode switching trigger 1445 may be used to switch the operation mode of the lighting device 12, such as the deep dim mode, the dim mode and the lighting mode described above.

The connection status indicator 1452 may indicate a status of the communicative connection between the remote controller 14 and the lighting device 12 in various manners. For example, the connection status indicator 1452 may be LED(s) and may emit green light when the connection is established and may be off or flash when such connection is down.

The power status indicator 1454 may indicate a status of power of the remote controller 14 in various manners. In the case of powered by battery(s), the power status indicator 1454 may indicate the remaining battery power. In some embodiments, the power status indicator 1454 may flash or emit red light in a low remaining power status.

The volume indicator 1456 may indicate the volume of the speaker(s) 1230 of the lighting device 12. Alternatively, the volume indicator 1456 may indicate the volume of the audio received from the lighting device 12 to show for example the volume of the baby's voice.

Exemplary Processes

Example processes performed with the lighting device 12 and the remote controller 14 of the present disclosure are described below.

Figure 5:
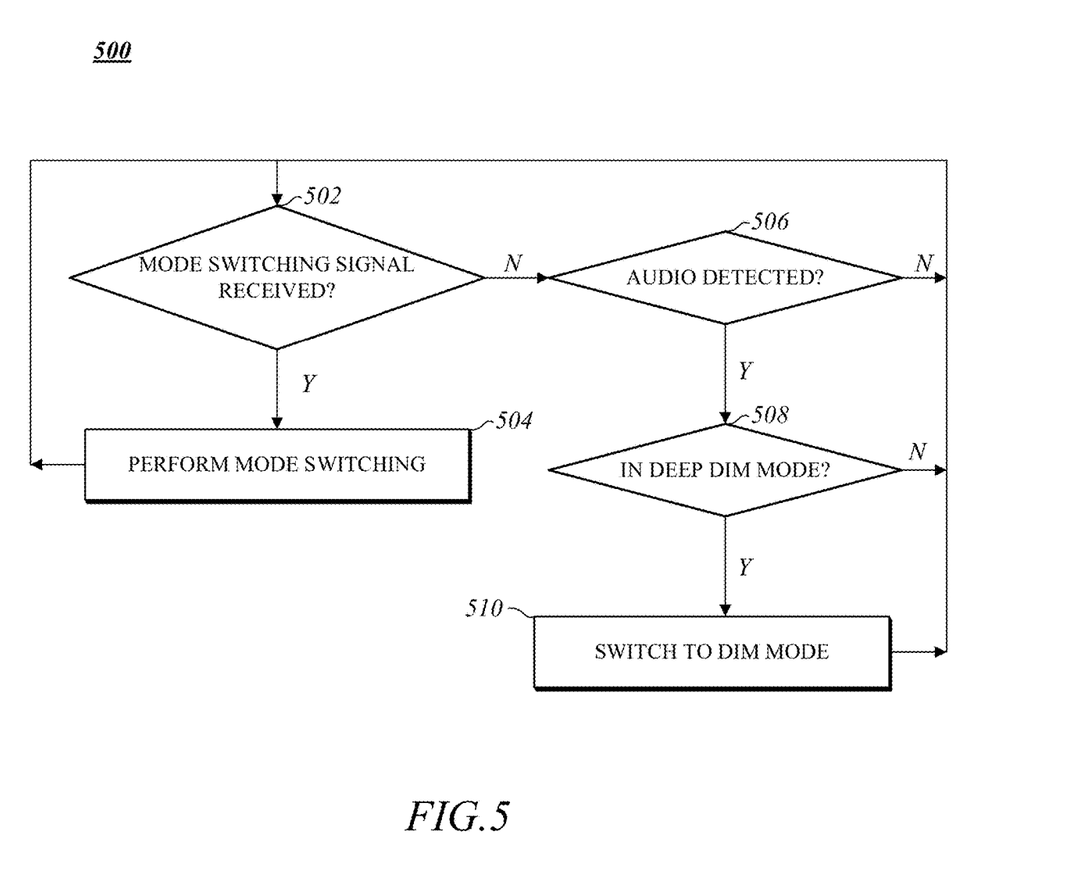
FIG. 5 is a flowchart diagram of an example process 500 for mode switching for the lighting device 12, in accordance with an embodiment.

FIG. 5 is a flowchart diagram of an example process 500 for mode switching for the lighting device 12, in accordance with an embodiment. The flow shown in FIG. 5 may be controlled by the controller 1214 of the lighting device 12.

As shown in FIG. 5, the flow may start from step 502. In step 502, assuming the lighting device 12 has been powered on for example by a wall switch and the lighting device 12 has been communicatively connected with a remote controller 14 automatically or by manual paring, the lighting device 12 may be operating in any mode, such as deep dim mode, dim mode or lighting mode described above. In step 502, the controller 1214 of the lighting device 12 may determine whether a mode switching signal is received from the remote controller 14. The mode switching signal may be generated by operating the mode switching trigger 1445 of the remote controller 14.

In response to a determination that a mode switching signal is received, process may proceed to step 504. In step 504, the controller 1214 may cause the lighting device 12 to switch to the mode indicated by the mode switching signal. Process may then return to step 502.

In the case where no mode switching signal is received in step 502, the controller 1214 may further determine whether an audio is detected by the microphone(s) 1240 of the lighting device 12 in step 506. If no audio is detected, process may then return to step 502. Further, in response to a determination that an audio is detected, process may proceed to step 508.

In step 508, the controller 1214 may further determine whether the lighting device 12 is operating in a deep dim mode where the brightness level of the lighting unit(s) 1220 is very low (e.g. 1%) or even zero. If the lighting device 12 is not operating in the deep dim mode, process may then return to step 502. Further, in response to a determination that the lighting device 12 is operating in the deep dim mode, process may proceed to step 510.

In step 510, the controller 1214 may cause the lighting device 12 to switch to the dim mode with a brightness level of for example 30% such that the user (for example parent) may for example observe the room through a camera mounted therein. In addition, such change of the brightness level from deep dim mode (e.g. 1%) to dim mode (e.g. 30%) may not cause excessive irritation to the baby. Process may then return to step 502.

Thus, manual mode switching and automatic mode switching can be implemented.

Figure 6:
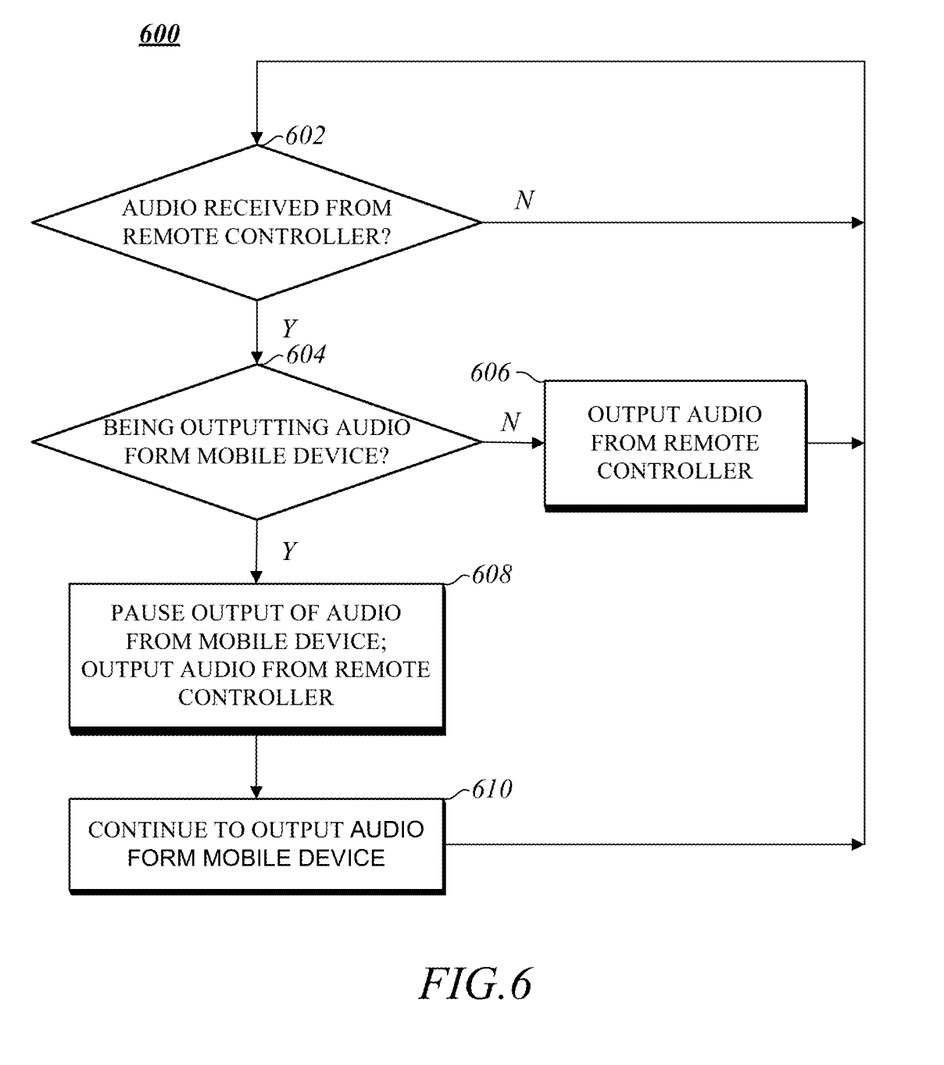
FIG. 6 is a flowchart diagram of an example process 600 for audio outputting by the lighting device 12, in accordance with an embodiment.

FIG. 6 is a flowchart diagram of an example process 600 for audio outputting by the lighting device 12, in accordance with an embodiment. The flow shown in FIG. 6 may be implemented by the controller 1214 of the lighting device 12.

As shown in FIG. 6, the flow may start from step 602. In step 602, it is assumed that the lighting device 12 has been powered on for example by a wall switch and the lighting device 12 has been communicatively connected with a remote controller 14 automatically or by manual paring. In step 602, the controller 1214 of the lighting device 12 may determine whether an audio is received from the remote controller 14. The audio may be acquired by the microphone(s) 1430 of the remote controller 14.

If no audio is received from the remote controller 14, process may return to step 602. Further, in response to a determination that an audio is received from the remote controller 14, process may proceed to step 604.

In step 604, the controller 1214 may further determine whether the speaker(s) 1230 of the lighting device 12 is outputting an audio from a mobile device 16. If not, process may proceed to step 606. In step 606, the controller 1214 may cause the speaker(s) 1230 of the lighting device 12 to output the audio received from the remote controller 14 in step 602.

In response to a determination that the speaker(s) 1230 of the lighting device 12 is outputting an audio from a mobile device 16, process may proceed to step 608. In step 608, the controller 1214 may cause the speaker(s) 1230 of the lighting device 12 to pause the output of the audio from the mobile device 16 and to output the audio received from the remote controller 14 in step 602.

Upon finishing the output of the audio received from the remote controller 14, process may then proceed to step 610. In step 610, the controller 1214 may cause the speaker(s) 1230 of the lighting device 12 to continue the output of the audio from the mobile device 16. In this situation, the microphone(s) 1240 of the lighting device 12 may be deactivated such that the sound around the lighting device 12 will not be acquired and transmitted to the remote controller 14. Process may then return to step 602 and the microphone(s) 1240 may be enabled after the output of the audio from the mobile device 16 is finished.

The process 600 shown in FIG. 6 may occur when parent intends to speak to the baby remotely while playing music with the mobile device 16. The music may be paused while speaking and continued after that.

Exemplary Arrangements

Example arrangements of the lighting device 12, the remote controller(s) 14 of the present disclosure together with the mobile device(s) 16 with different location and numbers are described below.

Exemplary Arrangement 1 may include one lighting device 12, one remote controller 14 and one mobile device 16. The lighting device 12 may be arranged in room #1 and the remote controller 14 and the mobile device 16 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency.

Thus, after powering on both of the lighting device 12 and the remote controller 14, the lighting device 12 may search and establish a communicative connection with the remote controller 14 automatically since only one remote controller 14 is found. Further, the mobile device 16 cannot connect to the lighting device 12 since the distance between them exceeds the coverage of the second wireless network L2.

With this arrangement, parent may hear the sound of the baby in room #1 and speak to the baby, whereas they cannot play music for the baby with the mobile device 16.

Exemplary Arrangement 2 may include one lighting device 12, one remote controller 14 and one mobile device 16. The lighting device 12 and the mobile device 16 may be arranged in room #1 and the remote controller 14 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency.

Thus, after powering on the lighting device 12, the remote controller 14 and the mobile device 16, the lighting device 12 may search and establish a communicative connection with the remote controller 14 automatically since only one remote controller 14 is found. Further, the mobile device 16 may also be able to connect with the lighting device 12 via the second wireless network L2 (e.g. Bluetooth).

With this arrangement, parent may hear the sound of the baby in room #1, speak to the baby, and play music for the baby with the mobile device 16.

Exemplary Arrangement 3 may include one lighting device 12, one remote controller 14 and one mobile device 16. The lighting device 12 may be arranged in room #1, the remote controller 14 may be arranged in room #3 and the mobile device 16 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency. Also, it is assumed that the distance between room #1 and room #3 does not exceed that of the first wireless network L1.

Thus, after powering on both of the lighting device 12 and the remote controller 14, the lighting device 12 may search and establish a communicative connection with the remote controller 14 automatically since only one remote controller 14 is found. Further, the mobile device 16 cannot connect to the lighting device 12 since the distance between them exceeds the coverage of the second wireless network L2.

With this arrangement, parent may hear the sound of the baby in room #1 and speak to the baby, whereas they cannot play music for the baby with the mobile device 16.

Exemplary Arrangement 4 may include one lighting device 12, one remote controller 14 and two mobile devices 16. The lighting device 12 and both of the mobile devices 16 may be arranged in room #1, and the remote controller 14 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency.

Thus, after powering on the lighting device 12, the remote controller 14 and both of the mobile devices 16, the lighting device 12 may search and establish a communicative connection with the remote controller 14 automatically since only one remote controller 14 is found. Further, the lighting device 12 may be able to connect with both of the mobile devices 16 via the second wireless network L2 (e.g. Bluetooth). In this case, the speaker(s) 1230 of the lighting device 12 may be controlled to output the last audio from one of the mobile devices 16. For example, assuming that the speaker(s) 1230 is outputting an audio from one of the mobile devices 16, the speaker(s) 1230 may pause the audio and start to output another audio from another one of the mobile devices 16 upon receiving another audio.

With this arrangement, parent may hear the sound of the baby in room #1, speak to the baby, and play music for the baby with two mobile devices 16. It is understood that the number of the mobile devices 16 can be varied as needed.

Exemplary Arrangement 5 may include one lighting device 12, one remote controller 14 and two mobile devices 16. The lighting device 12 may be arranged in room #1, and the remote controller 14 and both of the mobile devices 16 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency.

Thus, after powering on both of the lighting device 12 and the remote controller 14, the lighting device 12 may search and establish a communicative connection with the remote controller 14 automatically since only one remote controller 14 is found. Further, neither of the mobile devices 16 can get connection with the lighting device 12 since the distance between them exceeds the coverage of the second wireless network L2.

With this arrangement, parent may hear the sound of the baby in room #1 and speak to the baby, whereas they cannot play music for the baby with the mobile devices 16.

Exemplary Arrangement 6 may include one lighting device 12, one remote controller 14 and two mobile devices 16. The lighting device 12 and one of the mobile devices 16 may be arranged in room #1, and the remote controller 14 and another one of the mobile devices 16 may be arranged in room #2.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency.

Thus, after powering on the lighting device 12, the remote controller 14 and the mobile devices 16, the lighting device 12 may search and establish a communicative connection with the remote controller 14 automatically since only one remote controller 14 is found. Further, the mobile device 16 in room #1 can get connection with the lighting device 12 while the mobile device 16 in room #2 cannot get connection with the lighting device 12 since the distance between them exceeds the coverage of the second wireless network L2.

With this arrangement, parent may hear the sound of the baby in room #1 and speak to the baby, whereas they can play music for the baby with the mobile device 16 in room #1.

Exemplary Arrangement 7 may include two lighting devices 12, two remote controllers 14 and one mobile device 16. One of the lighting devices 12 and the mobile device 16 may be arranged in room #1, another one of the lighting devices 12 may be arranged in room #2, and both of the remote controllers 14 may be arranged in room #3.

Here, it is assumed that the distance between room #1 and room #2 exceeds the range of the second wireless network L2 but may not exceed that of the first wireless network L1 because the first wireless network L1 (e.g. less than 1 GHz) may have a longer coverage than the second wireless network L2 (e.g. 2.4 GHz) due to the lower frequency. Also, it is assumed that the distance between room #1 and room #3 does not exceed that of the first wireless network L1.

Thus, after powering on the lighting devices 12, the remote controllers 14 and the mobile device 16, the lighting devices 12 may not be able to establish a communicative connection with the remote controllers 14 since more than one remote controller 14 is found. User may perform manual pairing with the pairing trigger described above. However, in some embodiments, one of the lighting devices 12 and one of the remote controllers 14 may be grouped in advance. In this situation, the grouped lighting device 12 and the remote controllers 14 may establish a communicative connection automatically. Further, the mobile device 16 in room #1 can get connection with the lighting device 12 in room #1 other than the lighting device 12 in room #2.

With this arrangement, parent may hear the sound of the baby in room #1 and another baby in room #2 and speak to the babies with two lighting devices 12 and two remote controllers 14, whereas they can play music for the baby in room #1 with the mobile device 16 in room #1.

EXAMPLES

The following examples pertain to specific invention embodiments and point out specific features, elements, or steps that can be used or otherwise combined in achieving such embodiments.

In one example, there is provided a control device for controlling a lighting device, comprising: a communication unit operable to communicatively connect with a remote controller via a first wireless network and operable to communicatively connect with at least one mobile device via a second wireless network; and a controller coupled to the communication unit and the lighting device, and configured to control the lighting device based on at least one signal of those received by the communication unit from the remote controller and the at least one mobile device, wherein the first wireless network and the second wireless network operate at different bands.

In one example of the control device, the first wireless network operates at a band less than 1 GHz and the second wireless network operates at a band of 2.4 GHz.

In one example of the control device, the control device is housed within the lighting device.

In one example of the control device, the lighting device further comprises: at least one lighting unit; at least one microphone configured to acquire a first audio; and at least one speaker.

In one example of the control device, the controller is further configured to control the communication unit to: transmit the first audio to the remote controller via the first wireless network; receive a second audio from the remote controller via the first wireless network; and receive a third audio from the mobile device via the second wireless network.

In one example of the control device, the controller is further configured to control the speaker to output the second audio from the remote controller in response to a signal from the remote controller or to output the third audio from the mobile device in response to a signal from the mobile device.

In one example of the control device, the controller is further configured to control the lighting device to operate in different modes including a deep dim mode with a first brightness level, a dim mode with a second brightness level and a lighting mode with a third brightness level, in response to a signal from the remote controller, wherein in the lighting mode, the microphone and the speaker are both activated, and wherein the second brightness level is higher than the first brightness level, and the third brightness level is higher than the second brightness level.

In one example of the control device, the controller is further configured to control the lighting device to switch to the dim mode in response to an acquisition of the first audio by the microphone when operating in the deep dim mode.

In one example of the control device, the controller is configured to adjust a volume of the speaker in response to a signal from the remote controller.

In one example of the control device, the communication unit is further configured to automatically search the remote controller and to establish a communicative connection with the remote controller via the first wireless network when the remote controller is found.

In one example of the control device, the lighting device further comprises a remote controller pairing trigger for establishing the communicative connection with the remote controller via the first wireless network when the automatic communicative connection fails.

In one example of the control device, the controller is further configured to interrupt the output of the third audio via the speaker in response to an acquisition of the second audio from the remote controller via the first wireless network and to control the speaker to output the received second audio.

In one example of the control device, the communication unit is operable to communicatively connect with a plurality of the mobile devices via the second wireless network; and the controller is further configured to control the speaker to output the last third audio from one of the plurality of the mobile device.

In one example, there is provided a remote controller for communicating with a lighting device, comprises: a communication unit operable to communicatively connect with the lighting device; at least one speaker configured to output a first audio from the lighting device; and at least one microphone configured to acquire a second audio.

In one example of the remote controller, the communication unit is further configured to communicatively connect with the lighting device under a band of less than 1 GHz.

In one example of the remote controller, the communication unit is configured to transmit the second audio to the lighting device.

In one example of the remote controller, the communication unit is further configured to automatically search the lighting device and establish a communicative connection with the lighting device when the lighting device is found.

In one example of the remote controller, the remote controller is further configured to deactivate the automatic communicative connection when more than one lighting device is found by the communication unit.

In one example of the remote controller, the remote controller further comprises: a pairing trigger configured to establish the communicative connection with the lighting device when the automatic communicative connection is deactivated; a volume adjuster configured to adjust the volume of the speaker; a voicing trigger configured to turn on the microphone to acquire the second audio and transmit it to the lighting device; a connection status indicator configured to indicate a status of the communicative connection with the lighting device; and a power state indicator configured to indicate a power status of the remote controller.

In one example of the remote controller, the connection status indicator is further configured to flash when the communicative connection with the lighting device is disconnected.

In one example of the remote controller, the remote controller further comprises a mode switching trigger configured to transmit a mode switching signal to the lighting device.

In one example, there is provided a control device for controlling a lighting device, the lighting device comprises: at least one lighting unit; at least one microphone configured to acquire a first audio; and at least one speaker, and the control device comprises: a communication unit operable to communicatively connect with the remote controller; and a controller coupled to the communication unit and the lighting device, and configured to control the lighting device based on at least one signal of those received by the communication unit from the remote controller.

In one example of the control device, the communication unit is further operable to communicatively connect with at least one mobile device, and wherein the controller is further configured to control the speaker to output a second audio from the remote controller in response to a signal from the remote controller or to output a third audio from the mobile device in response to a signal from the mobile device.

In one example of the control device, the controller is further configured to control the communication unit to: transmit the first audio to the remote controller; receive a second audio from the remote controller; and receive a third audio from the mobile device.

In one example of the control device, the controller is further configured to control the speaker to output the second audio from the remote controller in response to a signal from the remote controller or to output the third audio from the mobile device in response to a signal from the mobile device.

In one example of the control device, the controller is further configured to control the lighting device to operate in different modes including a deep dim mode with a first brightness level, a dim mode with a second brightness level and a lighting mode with a third brightness level, in response to a signal from the remote controller, wherein in the lighting mode, the microphone and the speaker are both activated, and wherein the second brightness level is higher than the first brightness level, and the third brightness level is higher than the second brightness level.

In one example of the control device, the controller is further configured to control the lighting device to switch to the dim mode in response to an acquisition of the first audio by the microphone when operating in the deep dim mode.

In one example of the control device, the controller is configured to adjust a volume of the speaker in response to a signal from the remote controller.

In one example of the control device, the controller is further configured to interrupt the output of the third audio via the speaker in response to an acquisition of the second audio from the remote controller and to control the speaker to output the received second audio.

In one example of the control device, the communication unit is operable to communicatively connect with a plurality of the mobile devices; and the controller is further configured to control the speaker to output the last third audio from one of the plurality of the mobile device.

In one example, there is provided a lighting device, comprising: at least one lighting unit; and the control device of any one of the previous examples.

In one example, there is provided a lighting system, comprising: a lighting device, comprising the control device of any one of the previous examples; and the remote controller of any one of the previous examples.

In one example, there is provided a method for controlling a lighting device, the lighting device including: a communication unit; and a controller coupled to the communication unit, the method comprising: communicatively connecting, by the communication unit with a remote controller via a first wireless network; and communicatively connecting, by the communication unit with at least one mobile device via a second wireless network, wherein the first wireless network and the second wireless network operate at different bands.

In one example of the method, the first wireless network operates at a band less than 1 GHz and the second wireless network operates at a band of 2.4 GHz.

In one example of the method, the lighting device further includes: at least one lighting unit; at least one microphone configured to acquire a first audio; and at least one speaker, the method further comprises: transmitting, by the communication unit the first audio to the remote controller via the first wireless network; receiving, by the communication unit a second audio from the remote controller via the first wireless network; and receiving, by the communication unit a third audio from the mobile device via the second wireless network.

In one example of the method, the method further comprises: outputting, by the speaker the second audio from the remote controller in response to a signal from the remote controller; and outputting, by the speaker the third audio from the mobile device in response to a signal from the mobile device.

In one example of the method, the method further comprises: controlling, by the controller the lighting device to operate in different modes including a deep dim mode with a first brightness level, a dim mode with a second brightness level and a lighting mode with a third brightness level, in response to a signal from the remote controller, wherein in the lighting mode, the microphone and the speaker are both activated, and wherein the second brightness level is higher than the first brightness level, and the third brightness level is higher than the second brightness level.

In one example of the method, the method further comprises: controlling, by the controller the lighting device to switch to the dim mode in response to an acquisition of the first audio by the microphone when operating in the deep dim mode.

In one example of the method, further comprises: adjusting, by the controller a volume of the speaker in response to a signal from the remote controller.

In one example of the method, the method further comprises: automatically searching, by the communication unit the remote controller; and establishing, by the communication unit a communicative connection with the remote controller via the first wireless network when the remote controller is found.

In one example of the method, the method further comprises: interrupting, by the controller the output of the third audio via the speaker in response to an acquisition of the second audio from the remote controller via the first wireless network; and outputting, by the speaker the received second audio.

In one example of the method, the method further comprises: communicatively connecting, by the communication unit with a plurality of the mobile devices via the second wireless network; and outputting, by the speaker the last third audio from one of the plurality of the mobile device.

It is understood that this disclosure is not limitative to nursery application, it can be used for various applications by using some or all of the components or the units described herein.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The person skilled in the art shall understand that many modifications and variations may be made to the present invention. Therefore, it should be recognized that the intention of the claims is to cover all these modifications and variations within the real concept and range of the present invention.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A control device of a lighting device for controlling a component of the lighting device, the control device comprising:
   a communication unit operable to communicatively connect with a remote controller via a first wireless network and operable to communicatively connect directly with a mobile device via a second wireless network; and
   a controller coupled to the communication unit and the component of the lighting device, and configured to control a component of the lighting device based on a signal received by the communication unit from the remote controller and the mobile device,
   wherein the component of the lighting device comprises at least one of a lighting unit, a microphone, and a speaker,
   wherein the control device is housed within the lighting device along with the lighting unit, the microphone, and the speaker, and
   wherein the first wireless network and the second wireless network operate at different bandwidths.

2. The control device of claim 1, wherein the controller is configured to adjust a volume of the speaker of the lighting device in response to a signal from the remote controller.

3. The control device of claim 2, wherein the microphone is configured to acquire a first audio and the controller is further configured to control the communication unit to:

transmit the first audio to the remote controller via the first wireless network;
receive a second audio from the remote controller via the first wireless network; and
receive a third audio from the mobile device via the second wireless network.

4. The control device of claim 3, wherein the controller is further configured to control the speaker to output the second audio from the remote controller in response to a signal from the remote controller or to output the third audio from the mobile device in response to a signal from the mobile device.

5. The control device of claim 2, wherein the controller is further configured to control the lighting device to operate in different modes including a deep dim mode with a first brightness level, a dim mode with a second brightness level and a lighting mode with a third brightness level, in response to a signal from the remote controller,
wherein in the lighting mode, the microphone and the speaker are both activated, and
wherein the second brightness level is higher than the first brightness level, and the third brightness level is higher than the second brightness level.

6. The control device of claim 5, wherein the controller is further configured to control the lighting device to switch to the dim mode in response to an acquisition of the first audio by the microphone when operating in the deep dim mode.

7. The control device of claim 1, wherein the first wireless network operates at a bandwidth less than 1 GHz and the second wireless network operates at a bandwidth of 2.4 GHz.

8. The control device of claim 1, wherein the communication unit is further configured to automatically search the remote controller and to establish a communicative connection with the remote controller via the first wireless network when the remote controller is found.

9. The control device of claim 8, wherein the lighting device further comprises a remote controller pairing trigger for establishing the communicative connection with the remote controller via the first wireless network when the automatic communicative connection fails.

10. The control device of claim 3, wherein the controller is further configured to interrupt the output of the third audio via the speaker in response to an acquisition of the second audio from the remote controller via the first wireless network and to control the speaker to output the received second audio.

11. The control device of claim 3, wherein the communication unit is operable to communicatively connect with a plurality of the mobile devices via the second wireless network; and
the controller is further configured to control the speaker to output the last third audio from one of the plurality of the mobile devices.

12. A remote controller for communicating with a lighting device, the remote controller comprising:
a communication unit configured to communicatively connect with the lighting device;
a speaker of the remote controller configured to output a first audio; and
a microphone of the remote controller configured to acquire a second audio, and
the lighting device comprises a communication unit operable to communicatively connect with the remote controller via a first wireless network and operable to communicatively connect directly with a mobile device via a second wireless network; and a controller coupled to the communication unit and a component of the lighting device, and configured to control a component of the lighting device based on a signal received by the communication unit from the remote controller and the mobile device,
wherein the component of the lighting device comprises at least one of a lighting unit, a microphone of the lighting device, and a speaker of the lighting device,
wherein the communication unit and the controller of the lighting device is part of a control device housed within the lighting device along with the lighting unit, the microphone of the lighting device, and the speaker of the lighting device,
wherein the first wireless network and the second wireless network operate at different bandwidths,
wherein the communication unit of the remote controller is configured to transmit the second audio to the lighting device, and
wherein the first audio is generated by the microphone of the lighting device.

13. The remote controller of claim 12, wherein the first wireless network operates at a bandwidth less than 1 GHz and the second wireless network operates at a bandwidth of 2.4 GHz.

14. The remote controller of claim 12, wherein the communication unit of the remote controller is further configured to automatically search the lighting device and establish a communicative connection with the lighting device when the lighting device is found.

15. The remote controller of claim 14, wherein the remote controller is further configured to deactivate the automatic communicative connection when more than one lighting device is found by the communication unit of the remote controller.

16. The remote controller of claim 15, wherein the remote controller further comprises:
a pairing trigger configured to establish the communicative connection with the lighting device when the automatic communicative connection is deactivated;
a volume adjuster configured to adjust the volume of the speaker of the remote controller;
a voicing trigger configured to turn on the microphone of the remote controller to acquire the second audio and transmit it to the lighting device;
a connection status indicator configured to indicate a status of the communicative connection with the lighting device; and
a power state indicator configured to indicate a power status of the remote controller.

17. The remote controller of claim 16, wherein the connection status indicator is further configured to flash when the communicative connection with the lighting device is disconnected.

18. The remote controller of claim 12, wherein the remote controller further comprises a mode switching trigger configured to transmit a mode switching signal to the lighting device.

19. A control device of a lighting device,
the lighting device comprises:
a lighting unit;
a microphone configured to acquire a first audio;
a speaker; and
a control device comprising:
a communication unit operable to communicatively connect with a remote controller via a first wireless network; and a controller coupled to the communication unit and the lighting device via a second wireless network, and configured to control the lighting device based on a signal received by the communication unit from the remote controller, wherein the control device is housed within the lighting device along with the lighting unit, the microphone, and the speaker, and wherein the first wireless network and the second wireless network operate at different bandwidths.

20. The control device of claim 19, wherein the communication unit is further operable to communicatively connect with a mobile device, and wherein the controller is further configured to control the speaker to output a second audio from the remote controller in response to a signal from the remote controller or to output a third audio from the mobile device in response to a signal from the mobile device.

21. The control device of claim 20, wherein the controller is further configured to control the communication unit to:
transmit the first audio to the remote controller;
receive the second audio from the remote controller; and
receive the third audio from the mobile device.

22. The control device of claim 20, wherein the controller is further configured to control the speaker to output the second audio from the remote controller in response to a signal from the remote controller or to output the third audio from the mobile device in response to a signal from the mobile device.

23. The control device of claim 20, wherein the controller is further configured to control the lighting device to operate in different modes including a deep dim mode with a first brightness level, a dim mode with a second brightness level and a lighting mode with a third brightness level, in response to a signal from the remote controller, wherein in the lighting mode, the microphone and the speaker are both activated, and wherein the second brightness level is higher than the first brightness level, and the third brightness level is higher than the second brightness level.

24. The control device of claim 23, wherein the controller is further configured to control the lighting device to switch to the dim mode in response to an acquisition of the first audio by the microphone when operating in the deep dim mode.

25. The control device of claim 20, wherein the controller is further configured to interrupt the output of the third audio via the speaker in response to an acquisition of the second audio from the remote controller and to control the speaker to output the received second audio.

26. The control device of claim 20, wherein the communication unit is operable to communicatively connect with a plurality of the mobile devices; and the controller is further configured to control the speaker to output the last third audio from one of the plurality of the mobile devices.

27. A lighting device, comprising:
a lighting unit; and
the control device of claim 1.

28. A lighting system, comprising:
a lighting device, comprising the control device of claim 1; and
a remote controller for communicating with the lighting device that comprises: a communication unit operable to communicatively connect with the lighting device; a speaker configured to output a first audio from the lighting device; and a microphone configured to acquire a second audio.

29. A method for using a control device of a lighting device to control a component of the lighting device,
the control device including:
a communication unit; and
a controller coupled to the communication unit,
the method comprising:
communicatively connecting, by the communication unit with a remote controller via a first wireless network;
communicatively connecting, by the communication unit directly with a mobile device via a second wireless network;
receiving a signal by the communication unit from the remote controller and the mobile device; and
controlling a component of the lighting device based on the signal received by the communication unit from the remote controller and the mobile device,
wherein the component of the lighting device comprises at least one of a lighting unit, a microphone, and a speaker,
wherein the control device is housed within the lighting device along with the lighting unit, the microphone, and the speaker, and
wherein the first wireless network and the second wireless network operate at different bandwidths.

30. The method of claim 29, wherein
the microphone is configured to acquire a first audio; and
the method further comprises:
transmitting, by the communication unit the first audio to the remote controller via the first wireless network;
receiving, by the communication unit a second audio from the remote controller via the first wireless network; and
receiving, by the communication unit a third audio from the mobile device via the second wireless network.

31. The method of claim 30, further comprising:
outputting, by the speaker the second audio from the remote controller in response to a signal from the remote controller; and
outputting, by the speaker the third audio from the mobile device in response to a signal from the mobile device.

32. The method of claim 30, further comprising:
controlling, by the controller the lighting device to operate in different modes including a deep dim mode with a first brightness level, a dim mode with a second brightness level and a lighting mode with a third brightness level, in response to a signal from the remote controller,
wherein in the lighting mode, the microphone and the speaker are both activated, and
wherein the second brightness level is higher than the first brightness level, and the third brightness level is higher than the second brightness level.

33. The method of claim 32, further comprising:
controlling, by the controller the lighting device to switch to the dim mode in response to an acquisition of the first audio by the microphone when operating in the deep dim mode.

34. The method of claim 30, further comprising:
adjusting, by the controller a volume of the speaker in response to a signal from the remote controller.

35. The method of claim 29, further comprising:
automatically searching, by the communication unit of the remote controller; and
establishing, by the communication unit a communicative connection with the remote controller via the first wireless network when the remote controller is found.

36. The method of claim 30, further comprising:
interrupting, by the controller the output of the third audio via the speaker in response to an acquisition of the second audio from the remote controller via the first wireless network; and
outputting, by the speaker the received second audio.

37. The method of claim 30, further comprising:
communicatively connecting, by the communication unit with a plurality of the mobile devices via the second wireless network; and
outputting, by the speaker the last third audio from one of the plurality of the mobile devices.

38. A lighting device, comprising:
a lighting unit; and
the control device of claim 19.

39. A lighting system, comprising:
a lighting device, comprising the control device of claim 19 and a remote controller for communicating with the lighting device that comprises: a communication unit operable to communicatively connect with the lighting device; a speaker configured to output a first audio from the lighting device; and a microphone configured to acquire a second audio.

* * * * *